United States Patent [19]

Schloemann

[11] 4,135,195

[45] Jan. 16, 1979

[54] MAGNETOGRAPHIC PRINTING APPARATUS

[75] Inventor: Ernst F. R. A. Schloemann, Weston, Mass.

[73] Assignee: Raytheon Company, Lexington, Mass.

[21] Appl. No.: 788,191

[22] Filed: Apr. 18, 1977

Related U.S. Application Data

[63] Continuation of Ser. No. 673,224, Apr. 2, 1976, abandoned.

[51] Int. Cl.[2] .................... G03G 19/00; G11B 15/00

[52] U.S. Cl. .................... 346/74.1; 360/137; 365/10

[58] Field of Search .................... 346/74.1; 360/137, 55, 360/59, 77; 365/10

[56] References Cited

U.S. PATENT DOCUMENTS

| | | | |
|---|---|---|---|
| 3,161,544 | 12/1964 | Berry | 346/74.1 |
| 3,611,421 | 10/1971 | Benoit | 360/59 |
| 3,793,639 | 2/1974 | Enz | 360/55 |
| 3,793,640 | 2/1974 | Potgiesser | 360/55 |
| 3,815,107 | 6/1974 | Almasi | 365/10 |
| 3,827,077 | 7/1974 | Kobilka | 360/59 |
| 3,845,306 | 10/1974 | Kohlmannsperger | 360/59 |
| 3,935,594 | 1/1976 | de Jonge | 360/77 |
| 3,988,739 | 10/1976 | Fan | 346/74.1 |

OTHER PUBLICATIONS

IBM Tech. Discl. Bulletin, vol. 17, #4, 9–74, "Magnetic Bubble Domain Display," Dove et al., p. 1045.

IBM Tech. Discl. Bulletin, vol. 17, #11, 4–75, "Magnetic Bubble Domain Interactive Screen".

*Primary Examiner*—Jay P. Lucas
*Attorney, Agent, or Firm*—M. D. Bartlett; J. D. Pannone

[57] ABSTRACT

Magnetographic printing apparatus having scan magnetization of the recording surface. A bubble plate is provided adjacent the recording surface upon which bubble magnetic domains are propagated in a direction perpendicular to the direction of movement of the recording medium. A row of electromagnetic recording heads on the opposite side of the recording medium from the bubble plate are energized to produce a magnetic field which, when added to the magnetic field of the bubbles, is sufficiently high to cause magnetization of selected portions of the recording medium. In a second embodiment, a belt having magnetically permeable vanes mounted thereon is positioned on the side of the recording medium opposite the electromagnets. The vanes concentrate the magnetic field from the electromagnets to a sufficiently high value to magnetize the recording medium. Recording mediums having a compensation temperature greater than the temperature at which the recording medium is magnetized are disclosed with a heater to heat the recording medium to the compensation temperature to transfer toner particles to a paper surface and temporarily erase the recording medium. Embodiments are disclosed in which the toner particles are attracted directly to the surface of the paper eliminating the need for recording drum or belt.

22 Claims, 11 Drawing Figures

MAGNETOGRAPHIC PRINTING APPARATUS

CROSS-REFERENCE TO RELATED CASES

This is a continuation of application Ser. No. 673,224, filed Apr. 2, 1976, now abandoned.

BACKGROUND OF THE INVENTION

1. Field of the Invention

The invention pertains to the field of magnetographic printing in which a magnetic field pattern is produced in the form of characters or other indicia to be printed upon a paper or other printing surface.

2. Description of the Prior Art

Magnetic printing has in the past been shown to be technically feasible but heretobefore economically uncompetitive with printers operating upon electrostatic principles. One major difficulty has been that magnetographic printing required complex recording heads and associated drive circuitry. Recording heads used in previous devices required many styli or laminations for each character in a row of characters being printed. Approximately ten styli or laminations were required for each character. For standards of 80 or 132 characters per line, the cost of driving each styli or lamination was economically prohibitive.

A second problem with conventional magnetic printing devices involved the transfer of an image from a recording medium to paper or other printing surface. In such systems, a latent magnetic image of the characters or indicia to be printed was first inscribed upon a magnetic recording surface then rendered visible by the application of magnetic toner particles. The toner particles were then transferred to paper upon which they were fixed by heat. The image to be printed was not immediately visible after recording. It was also difficult to achieve sufficiently dark prints because the transfer of toner from the recording surface to the paper was far from complete. Moreover, the recording surface had to be completely cleaned of all remaining toner particles before it could be re-recorded and used again for another image. Even if small traces of toner were left after each image printing, the traces would eventually build up, seriously effecting the performance of the device.

SUMMARY OF THE INVENTION

Accordingly, it is an object of the present invention to provide a magnetic printing device having a simplified and less costly recording head.

Also, it is an object of the present invention to provide a magnetic printing device having an improved printed image such as a device in which the toner particles are attracted directly to the paper or other printing surface.

Furthermore, it is an object of the invention to provide such a magnetic printing device having improved transfer of the toner particles to printing surface.

These, as well as other objects of the invention, may be met by providing most generally the combination of one or more means for producing a magnetic field in response to an electric current and means interacting with the magnetic field produced by the magnetic field producing means for providing a magnetic field at predetermined positions upon a surface different from the magnetic field produced by the magnetic field producing means. The magnetic field producing means may comprise one or more electromagnet means while the interacting means may comprise either means for supporting one or more magnetic domains of predetermined dimensions or one or more substantially magnetically permeable vanes. Means may also be provided for activating the magnetic field producing means in such a way as to produce predetermined patterns upon the surface.

Objects of the invention may also be met by providing the combination of means for supporting one or more magnetic domains of predetermined dimensions, that is, magnetic domains which exist in certain materials which have been altered in shape by application of a magnetic field so as to increase the predominance of domains having a preferred orientation, and means for varying a magnetic field which interacts with the magnetic fields produced by the magnetic domains, toner particles being deposited upon a printing surface in response to the action of the magnetic field varying means. A magnetizable recording surface may be provided which is magnetized in response to the magnetic fields from the magnetic domains and from the magnetic field varying means. The magnetic field varying means may produce at least first and second magnitudes of values of a magnetic field while the magnetizable recording surface may have a course of magnetization less than the sum of the magnetic field from one of the magnetic domains and the first magnitude of magnetic field and greater than the sum of the magnetic field from one of the magnetic domains and the second magnitude of the magnetic field produced by the magnetic field varying means. Means may be provided for propagating the magnetic domains in a direction substantially parallel to the recording surface and perpendicular to the direction of motion of the recording surface should the recording surface be in motion. The means for supporting the magnetic domains is preferably adjacent a first side of the printing surface while means is provided for supplying toner particles to the printing surface, the supplying means being adjacent a second side of the printing surface.

The invention may also be practiced by providing the combination of a magnetizable recording medium and means for varying the magnetization of at least portions of the recording medium by varying the temperature of the recording medium. Means may further be provided for selectively magnetizing portions of the recording medium in predetermined or preferred patterns of characters, lines or any other indicia that is desired to be printed. The patterns recorded upon the recording medium at a first temperature which is below the compensation or magnetic compensation temperature of the recording medium, the patterns being substantially demagnetized by the magnetization varying means by heating at least portions of the recording medium to a temperature above the compensation temperature and in some cases above the Curie temperature. The recording medium may comprise either a recording belt having a magnetizable surface or a cylindrical drum having such a surface. The magnetizing means may comprise means for supporting one or more magnetic domains of predetermined dimensions and magnetic field producing means which produces first and second values of a magnetic field, that field interacting with the magnetic field produced by the one or more magnetic domains in such a manner as to magnetize portions of the recording medium in preferred or predetermined patterns.

The invention may further be practiced by providing the combination of a recording medium, means for providing a plurality of magnetic domains adjacent one surface of the recording medium, means for propagating the magnetic domains parallel to the surface of the recording medium and perpendicular to the direction of motion of the recording medium should the recording medium be in motion, and means for producing at least first and second values of a magnetic field in response to an electrical current wherein the magnetic field from the magnetic field producing means interacts with the magnetic field of the magnetic domains at at least one of the surfaces of the recording medium. The means for producing the first and second values of the magnetic field preferably comprises a plurality of electromagnet means which are disposed substantially parallel to the propagation path of the magnetic domains. The means for providing a plurality of magnetic domains preferably comprises a plate of ferromagnetic material such as an orthoferrite material and in preferred embodiments $YbFeO_3$ or $YFeO_3$. The propagating means may comprise at least one meander strip upon a surface of the plate and preferably comprises two meander strips placed in phase quadrature with one another. The recording medium has a coercive magnetization less than the total magnetic field at the recording medium when the magnetic field producing means produces the first value of the magnetic field and greater than the total magnetic field at the recording medium or the surface thereof when the magnetic field producing means produces the second value of magnetic field. The recording medium may comprise either a belt or drum having a magnetizable surface. The recording medium has a compensation temperature greater than the temperature of the recording medium during magnetization of the medium. Means is provided for temporarily demagnetizing the recording medium which, in preferred embodiments, includes means for heating the recording medium to the compensation temperature of the medium.

Further objects of the invention may be met by providing the combination of a continuous surface of magnetized material, means for rotating the continuous surface, means for supplying magnetic toner particles to the continuous surface, means for providing a magnetic field of predetermined amplitude along predetermined portions of a line parallel to the continuous surface and perpendicular to the direction of movement of the continuous surface, and means for passing a sheet of printing material between the magnetic field producing means and the continuous surface, preferably with a small gap between the sheet of recording material and the continuous surface. The printing material may be paper, a plastic film, or any other material upon which it is desired to print an image. The magnetic field producing means may comprise the combination of means for supporting one or more magnetic domains of predetermined dimensions and means for propagating the magnetic domains along the line parallel to the continuous surface. A plurality of electromagnet means may be positioned along the line parallel to the continuous surface. Means for activating the electromagnets is preferably provided for magnetizing the continuous surface in predetermined and preferred patterns. The predetermined patterns may comprise alphabetic and/or numeric characters or symbols. Each of the electromagnet means has a width which the corresponds to the width of each of the characters. The continuous surface may comprise either a continuous belt or a cylindrical drum. The continuous surface is magnetized with the direction of magnetization being cyclically varied at a predetermined distance.

Still further objects of the invention may be met by providing the combination of a recording surface, a plurality of electromagnet means arrayed along a line parallel to the surface of the recording surface upon a first side of the surface, a plurality of magnetically permeable vanes which are movable along the lines and which are spaced apart from one another by substantially the same distance as are spaced the electromagnet means, the vanes being positioned upon the side of the surface opposite the first surface. Means may be provided for moving the vanes along the line which may preferably comprise a rotating belt. Means is ordinarily provided for activating the electromagnetic means to magnetize recording surface in predetermined patterns. Furthermore, means may be provided for supplying toner particles to the recording surface, the particles being magnetic so as to adhere to magnetized patterns on the recording surface, and means for transferring the toner particles from the recording surface to a printing surface. In some embodiments, the recording surface has a magnetic compensation temperature higher or greater than the temperature of the recording surface at the time that the patterns are magnetized thereon. In those embodiments, the transferring means may include means for heating the recording surface to the compensation temperature.

DESCRIPTION OF THE PREFERRED EMBODIMENTS

Figure 1:
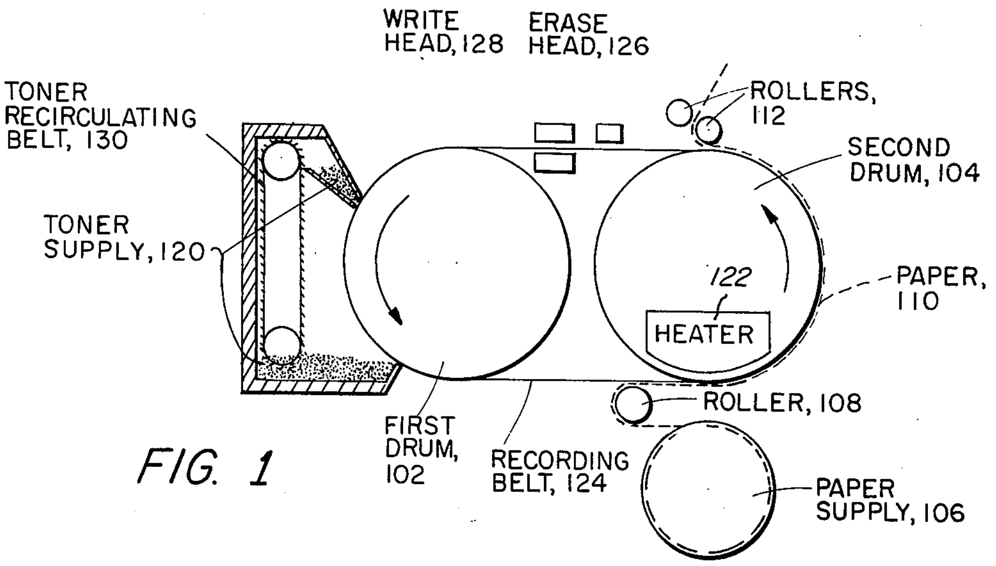
FIG. 1 is a simplified cross-sectional view of electromagnetic printing apparatus in accordance with one embodiment of the invention.

Referring first to FIG. 1, there is shown therein a simplified cross-sectional view of a magnetographic printing apparatus in which the present invention may be used to advantage. Magnetizable recording belt 124 is coupled around first drum 102 and second drum 140 and revolved thereby. Recording belt 124 includes a plastic film metal substrate with a magnetizable layer on the outer surface thereof. Write head 128 activated by external electronic control circuitry (not shown), produces a magnetic field which magnetizes the magnetizable layer of recording belt 124 in predetermined character patterns. Preferably, within each pattern, the direction of magnetization is periodically varied in direction at a preferred rate corresponding to the size and other magnetic properties of the magnetic toner particles employed. Portions of recording belt 124 upon which no character patterns are magnetized may be magnetized with a magnetic field having uniform direction or substantially no magnetization at all may be present.

As the magnetized portions of recording belt 124 pass under the upper portion of toner supply 120, magnetic toner particles are uniformly distributed over the surface of recording belt 124 adhering preferentially to portions magnetized in character patterns. Portions of recording belt 124 upon which no character patterns are magnetized produce insufficient magnetic force for holding magnetic toner particles. Toner particles from those areas drop from the force of gravity into the lower portion of toner supply 120 from which they are recirculated to the upper portion of toner supply 120 by toner recirculating belt 130.

The toner particles in the form of the characters to be printed is next transferred to the surface of paper 110 furnished by paper supply 106 in a roll. Paper 110 is fed around roller 108 so that recording belt 124 is pressed against paper 110 as they pass around the outside perimeter of second drum 104.

Heater 122 heats the surface of second drum 104 to a sufficient temperature such that the toner particles at least partially melt and adhere to the surface of paper 110. Paper 110, after the patterns have been affixed thereto, is pulled away from the outer surface of second drum 104 through rollers 112. The printed paper may then be cut or folded as desired. Erase head 126 demagnetizes the character patterns from the magnetizable layer of recording belt 124 or alternately magnetizes the magnetizable layer with a uniform direction and magnitude of magnetization. If it is desired to make more than one copy from a single magnetization pattern, erase head 126 is deactivated while recording belt 124 continuously circulates until the required number of copies has been produced.

In accordance with one aspect of the invention, the magnetizable layer of recording belt 124 has a magnetic compensation temperature greater than the temperature of the recording belt as it passes write head 128, that is, the temperature at which information is recorded upon recording belt 124. The magnetic compensation temperature of the magnetizable layer of recording belt 124 is also chosen to be approximately equal to the temperature of the surface of second drum 104 in contact with paper 110.

Recording belt 124, because it is a thin layer of material, quickly rises to the same temperature as the surface of second drum 104. As the temperature rises to the magnetic compensation temperature of the magnetizable layer, the magnitude of the magnetization within the character patterns drops markedly easing the release of the toner particles from the surface of recording belt 124 and facilitating their transfer to the surface of paper 110.

In one preferred embodiment of the invention, the magnetizable layer of recording belt 124 is fabricated as a sputtered amorphous film of a gadolinium-cobalt alloy containing, for example, 77 atomic percent of cobalt. The actual compensation temperature is of course dependent upon the relative proportions of the two constituents of the alloy. With this material, the saturation magnetization of a magnetizable layer constructed with the material is a very sensitive function of temperature. The saturation magnetization drops rapidly as the temperature is increased from room temperature to 50° C. Of course, embodiments of the invention may be constructed using such a magnetizable layer on the surface of a recording drum or other recording medium other than a recording belt as herein shown.

Figure 2:
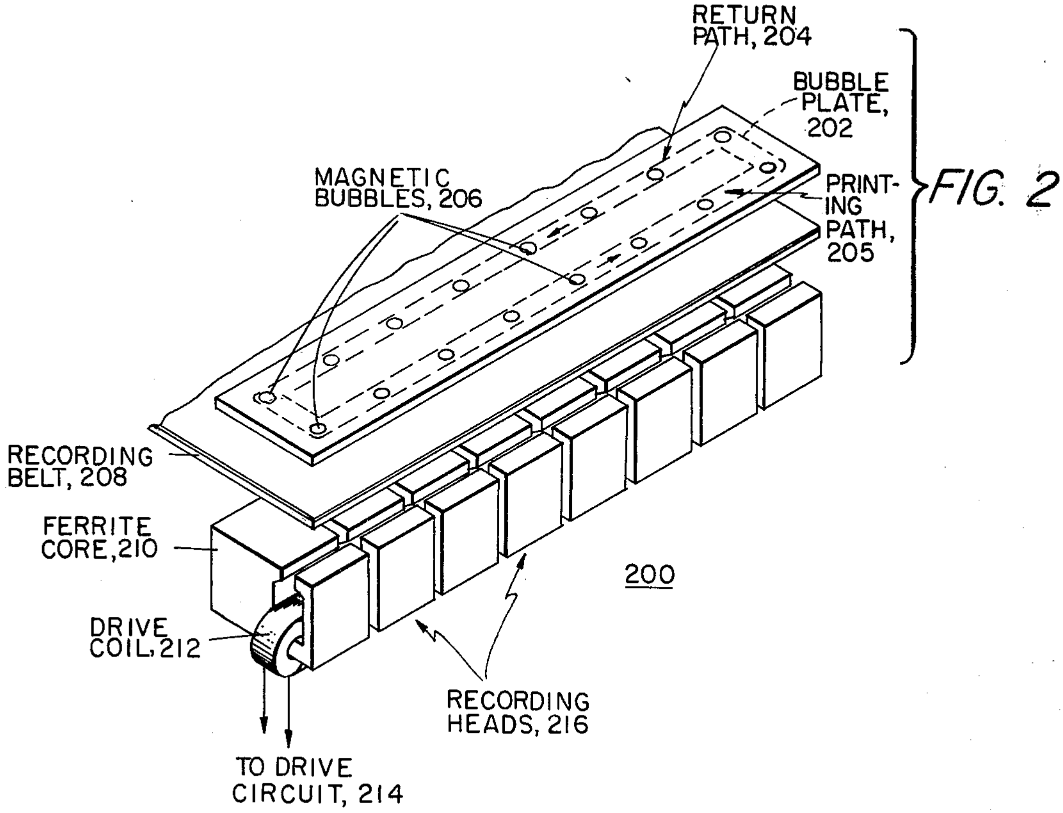
FIG. 2 is a perspective view of one embodiment of a recording head in accordance with the teachings of the invention.
Figure 3:
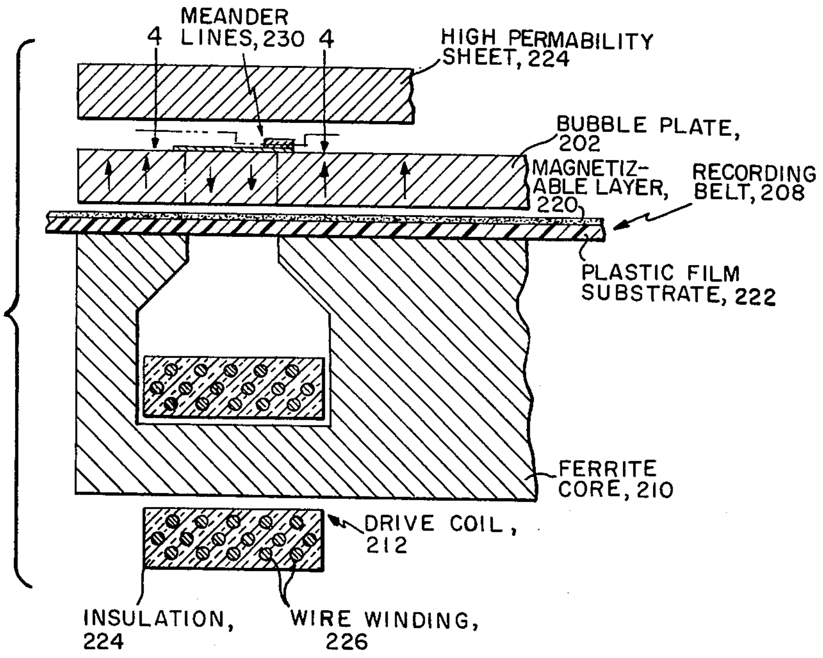
FIG. 3 is a cross-sectional view taken through FIG. 2.

Referring next to FIGS. 2 and 3, there is shown a write or recording head such as may be used with the embodiment of the invention shown in FIG. 1 or in other embodiments to be described. Upon one side of recording belt 208 is located magnetic bubble plate 202. Bubble plate 202 is fabricated of a material such as a ferrite material and particularly orthoferrite material such as $YbFeO_3$ or $YFeO_3$. In the absence of any external magnetic field, such materials have many microscopic magnetic regions or domains having a magnetic field perpendicular to the planar surface of the bubble plate with the magnetic field direction alternating between adjacent domains. In the absence of an externally applied magnetic field, domains having an UP polarization or direction of magnetization occupy approximately the same total area as occupied by magnetic domains having the opposite or DOWN direction of magnetic polarization. With a magnetic field applied from an external source with the field perpendicular to the planar surface of bubble plate 202, magnetic domains having a direction of magnetization in the same direction as that of the externally applied magnetic field occupy a greater proportion of the area of bubble plate 202 as the magnitude of the external field is increased. At a magnitude of externally applied field determined by the particular characteristics of the material employed, the magnetic domains having a direction of magnetization opposite the direction of the externally applied magnetic field are shrunk to small cylindrical domains which have been termed in the art magnetic "bubbles." These small domains or bubbles may be freely moved about the surface of a bubble plate by a number of means such as an alternating locally applied field. Methods for creating such magnetic bubbles and methods for moving such bubbles are disclosed in the article, "Magnetic Bubbles," *Scientific American*, Nov. 1971, pp. 78–90.

On the opposite side of recording belt 208 from bubble plate 202 is located a row of recording heads 216. One recording head 216 is provided for each character or symbol for a row of characters or symbols to be printed. Only eight such recording heads are shown in the view of FIG. 2, although many recording heads 216 may be provided as required. Each recording head 216 is constructed from a ferrite core 210 having a shape as shown with an open portion around which is wrapped drive coil 212 and a gap of predetermined dimensions on the side nearest recording belt 208. The width of recording heads 216 is chosen in accordance with the width of the widest character in the available character or symbol repertoire.

A plurality of magnetic bubbles 206 are produced upon bubble plate 202 by a magnetic bubble generator (not shown). Magnetic bubbles 206 are spaced apart by the same spacing as like edges of adjacent ones of recording heads 216. Magnetic bubbles 206 are propagated down printing path 205 which directly overlies the line along the gaps of recording heads 216.

When one of recording heads 216 is activated with a first relatively low or in some embodiments zero value of electric current, the total field formed as the vector sum of the magnetic field from that recording head and the one of magnetic bubbles 206 then directly above that recording head is insufficient to overcome the coercivity of the magnetizable material or magnetizable layer of recording belt 208. For a second and greater value of electric current through the corresponding drive coil 212, recording head 216 produces a magnetic field sufficient when added with the magnetic field produced by a corresponding one of magnetic bubbles 206 that will overcome the coercivity of magnetizable layer 220, thereby magnetizing magnetizable layer 220 immediately adjacent the magnetic bubble. As long as the second value of electric current is applied to one of drive coils 212, magnetizable layer 220 will be magnetized in the line along which the corresponding magnetic bubble 206 propagates. The length of the magnetized area is controlled by the propagation velocity of magnetic bubbles 206 and the time during which the second value of electric current is supplied to drive coil 212.

Figure 4:
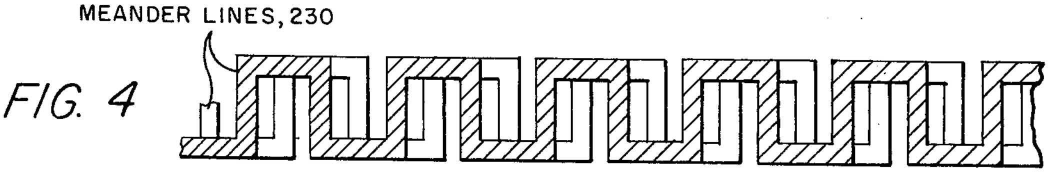
FIG. 4 is a planar view of the meander lines of the recording head shown in FIGS. 2 and 3.

Referring now to FIG. 4, there is shown a planar and partially cross-sectional view of meander lines 230 which are used to propagate magnetic bubbles 206 upon bubble plate 202. Meander lines 230 are each formed as a square zig-zag pattern of a conductive metal strip having a pole pitch or loop length approximately the same as the diameter of one of magnetic bubbles 206. Meander lines 230 are spaced apart by approximately one-quarter pole pitch. Upon activation of each by an alternating current in the other one of meander lines 230, magnetic bubbles 206 propagate with a velocity dependent upon the frequency of the AC currents. Meander lines 230 may be produced using well-known photolithographic techniques. Of course, there should be an insulated layer between the two lines.

Figure 5:
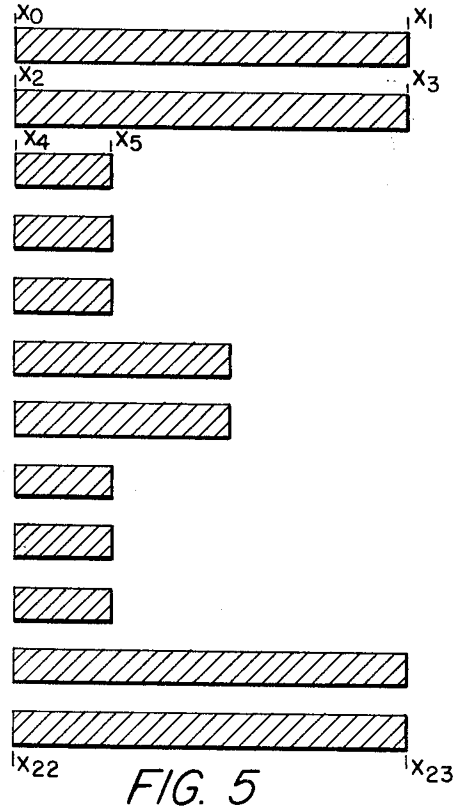
FIG. 5 shows a character printed in accordance with the invention.
Figure 6:
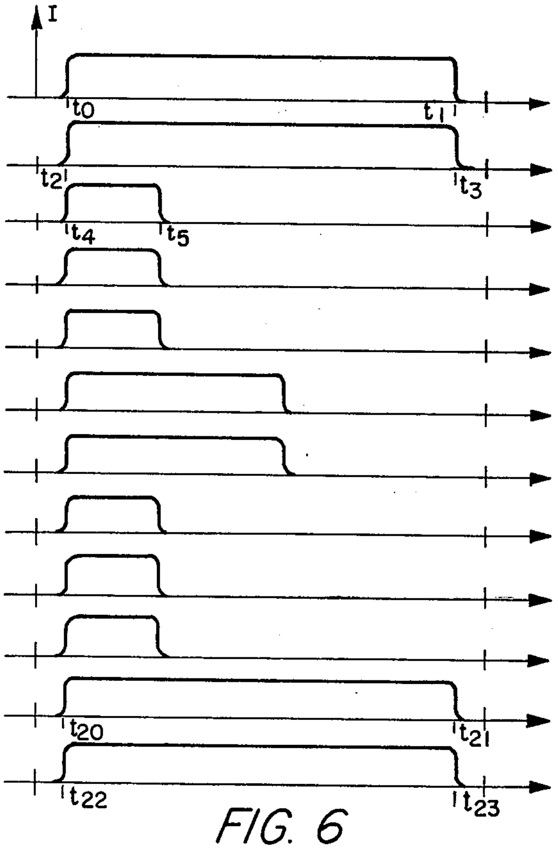
FIG. 6 shows a series of waveforms used in producing the characters shown in FIG. 5.

Reference is now made to FIGS. 5 and 6 wherein there is shown in FIG. 5 a letter "E" as formed with the apparatus of the invention and in FIG. 6 the waveforms of a current applied to one of drive coils 212 required for magnetizing magnetizable layer 220 in the pattern shown in FIG. 5. The waveforms shown in FIG. 6 are labeled in time sequence $t_0, t_1, \ldots t_{23}$ to show the actual order. The various waveforms would be placed end-to-end in sequence to view the actual sequence of current applied to one of drive coils 212 to produce the pattern of FIG. 5. That waveform is divided into sequential portions as shown in FIG. 6 for reasons of clarity. That selected drive coil 212 is activated with the higher or second value of electric current during the time period $t_0$ to $t_1$ during which time a first magnetic bubble 206 traverses the distance from $x_0$ to $x_1$ magnetizing the corresponding portions of magnetizable layer 220. At time $t_2$, recording belt 208 has advanced so that the next following magnetic bubble 206 is positioned at $x_2$. At that time, drive coil 212 is again activated with the second value of current which remains at that level until $t_3$ at which time the second bubble has reached $x_3$. For the third bubble in sequence, the drive coil 212 is activated for a shorter period of time from $t_4$ to $t_5$ magnetizing recording belt 208 from $x_4$ to $x_5$. The process continues in this manner until the entire character pattern has been magnetized upon magnetizable layer 220. Of course, each of drive coils 212 may be simultaneously activated each with any desired character pattern.

The quiescent magnetic field used to sustain magnetic bubbles 206 may be produced in one of at least two ways. Most simply, a permanent magnet in the form of a sheet is placed adjacent bubble plate 202 on the same side as meander lines 230 producing the required value of magnetic field. A second method, as shown in FIG. 3, a sheet 224 having a high magnetic permeability is placed adjacent bubble plate 202. High permeability sheet 224 is not permanently magnetized. During quiescent conditions when it is not desired to magnetize magnetizable layer 220, a first magnitude of electric current is passed through each drive coil 212 producing a magnetic field from ferrite core 210, the magnetic path between sides of the gaps being closed at least partially through high permeability sheet 224 which causes the magnetic field to also pass through bubble plate 202. When the current through a drive coil 212 is increased to the second or higher value, the magnetic field then produced when combined with the magnetic field of the magnetic bubbles is sufficient to overcome the coercive magnetization of magnetizable layer 220 thereby causing permanent magnetization. The coercive magnetization of magnetizable layer 220 should be intermediate the two values of magnetic field. High permeability sheet 224 and meander lines 230 have been omitted from the view of FIG. 2 for clarity of illustration.

Figure 10:
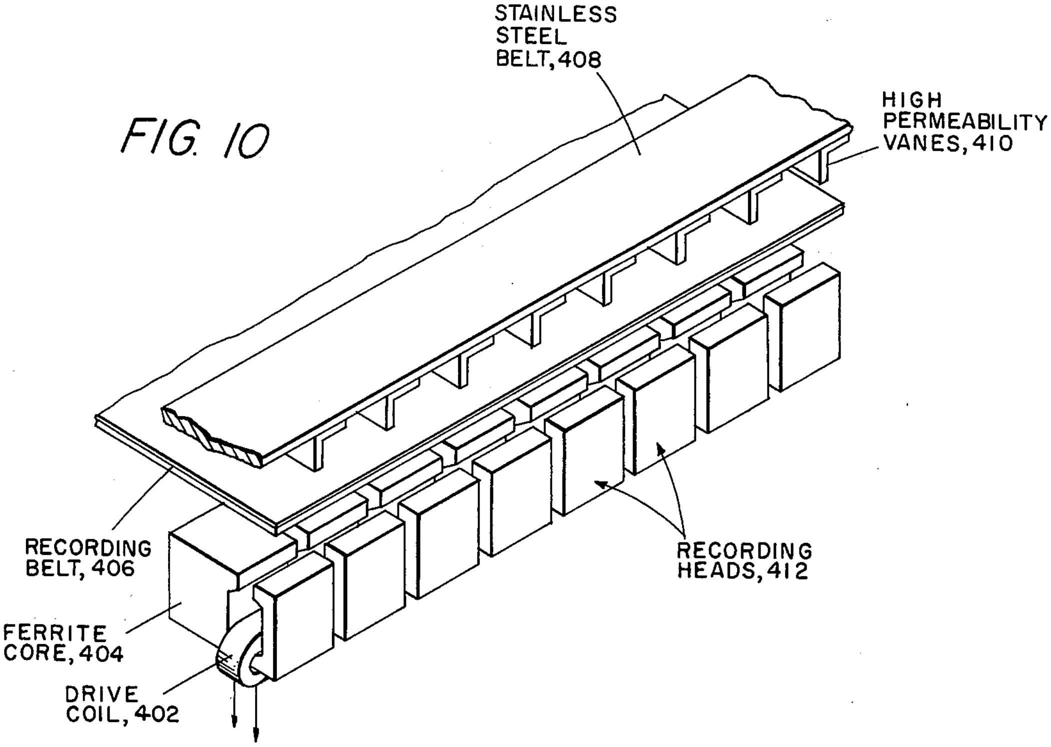
FIG. 10 is a perspective view of another embodiment of a recording head in accordance with the invention.
Figure 11:
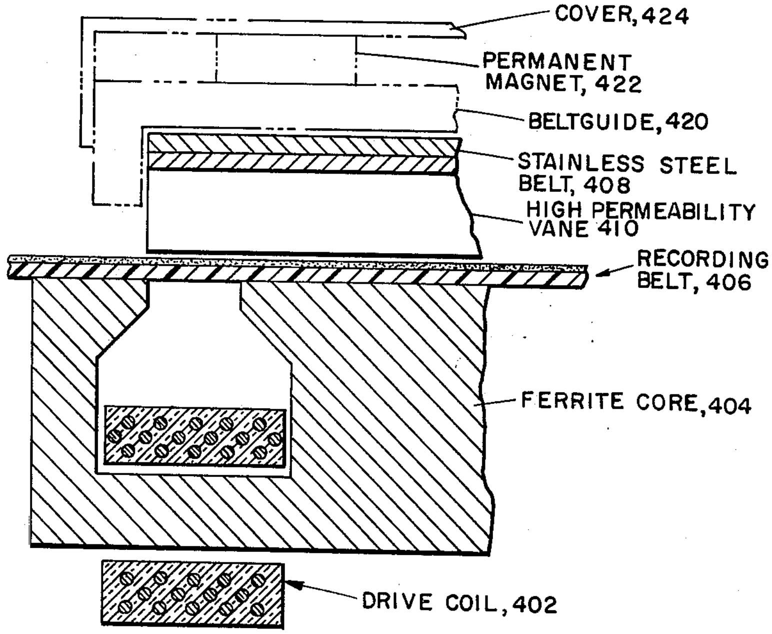
FIG. 11 is a cross-sectional view taken through FIG. 10.

An alternate embodiment of the invention is shown in the views of FIGS. 10 and 11. The apparatus functions the same as before with the exception that bubble plate 202, meander lines 230, and high permeability sheet 224 have been replaced by a stainless steel belt 408 upon which are mounted high permeability vanes 410. Stainless steel belt 408 is movable so as to scan vanes 410 parallel to the surface of recording belt 406 over the gaps in ferrite cores 404 of recording heads 412. High permeability vanes 410 serve to concentrate the field produced by recording heads 412 at the magnetizable layer of recording belt 406 causing permanent magnetization thereof when the field is sufficiently high. High permeability vanes 410 are spaced apart the same distance as were the magnetic bubbles, that is, the same distance apart as are like edges of adjacent ones of recording heads 412. The magnetizable layer of recording belt 406 is magnetized in linear patterns at the rate at which high permeability vanes 410 are swept along the length of recording heads 412.

To maintain registration between stainless steel belt 408 and recording heads 412, stainless steel belt 408 is attracted to the upper left-hand corner of a belt guide 420 (shown in FIG. 11 but not shown in FIG. 10 for clarity of illustration) by permanent magnet 422 mounted to cover 424. Belt guide 420 is preferably constructed of a non-magnetic material.

Instead of an endless steel belt as is shown in FIGS. 10 and 11 a closed chain may be used. In either case, the spacing between recording heads 412 must be maintained the same as the spacing between vanes 410. In order to correct for changes in spacing between vanes 410 caused by stretching of stainless steel belt 408 or a chain, recording heads 412 may be mounted upon a slightly elastic strip which is rigid enough to hold them firmly in place with means provided for varying the tension within the elastic strip so that the center-to-center spacing of recording heads 412 may be adjusted.

Figure 7:
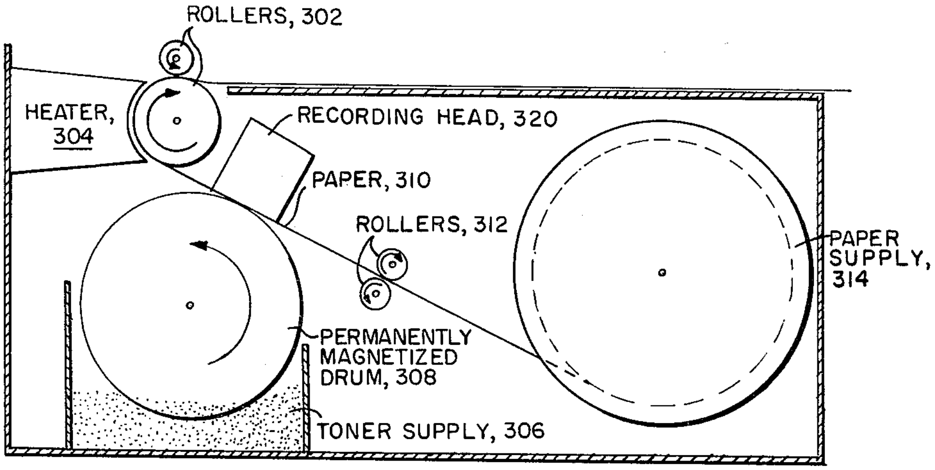
FIG. 7 shows a simplified cross-sectional view of magnetographic printing apparatus in accordance with another embodiment of the invention.
Figure 8:
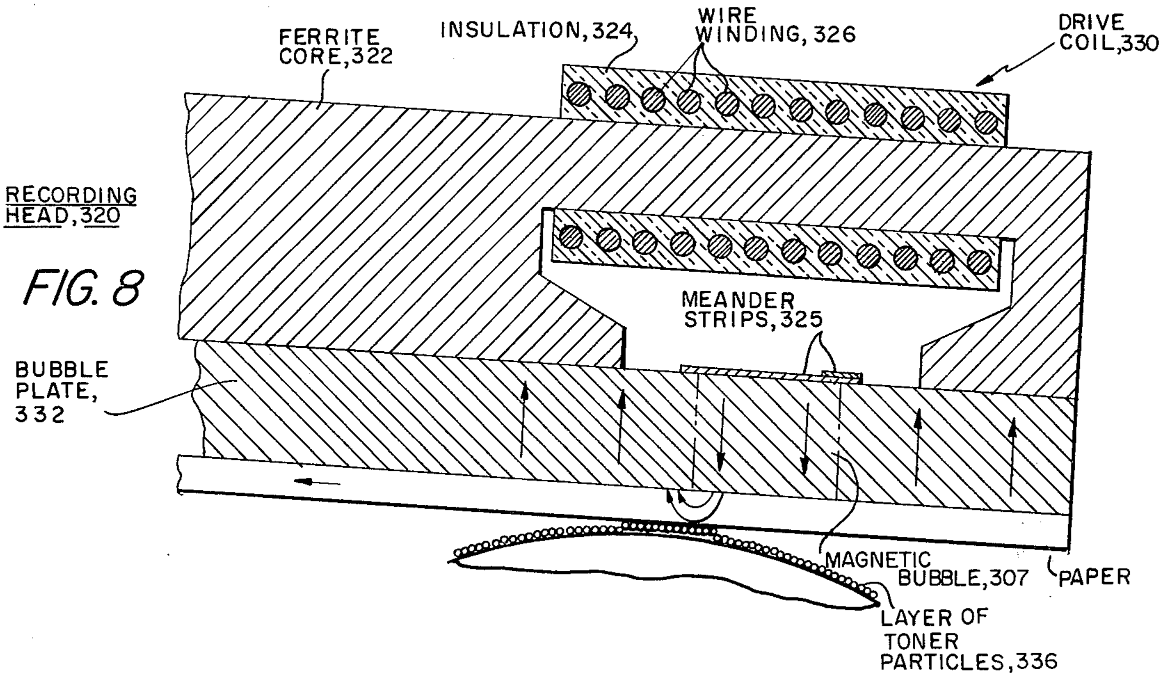
FIG. 8 is a cross-sectional view of a portion of the recording head as used with one embodiment of the invention.

Referring next to FIGS. 7 and 8, there is shown therein an embodiment of the invention in which the need for a magnetizable recording medium, such as a drum or belt, is eliminated. The structure of the device is therefore simplified and the quality of image improved because of the elimination of problems associated with transferring an image formed of magnetic toner particles from a recording to paper surface. Referring first to FIG. 8, bubble plate 332 is provided immediately adjacent ferrite core 322 of recording head 320. Drive coil 330 is excited with first and second levels of electric current as before. Paper 310 is passed between bubble plate 332 and permanently magnetized drum 308 immediately adjacent bubble plate 332 and with a small gap separating the lower surface of paper 310 from the upper surface of permanently magnetized drum 308.

Permanently magnetized drum 308 has a permanently magnetized surface magnetized in such a manner that a single layer of magnetic toner particles adheres thereto as permanently magnetized drum 308 rotates past toner supply 306. For the first value of electric current flowing in drive coil 330, the total magnetic field from magnetic bubble 307 and ferrite core 322 is insufficient to dislodge particles from layer of toner particles 336 from surface of permanently magnetized drum 308. As the current in drive coil 330 is increased to the second and higher value of current, the total magnetic field at the lower surface of paper 310 is increased to the point that the attraction is stronger for the magnetic particles at the surface of paper 310 than to the surface of permanently magnetized drum 308. The individual toner particles then transfer directly from permanently magnetized drum 308 to the surface of paper 310. Magnetic bubbles 307 are propagated as before by meander strips 325 and the character patterns scanned in the same fashion as heretobefore described except that the recording surface is eliminated and the toner particles attracted directly to the surface of the paper.

Typical magnetographic printing apparatus using a recording head 320 as in FIG. 8, is shown in FIG. 7. Paper is supplied from a paper supply roll 314 through rollers 312. A toner supply 306 is placed at the bottom of permanently magnetized drum 308 with the magnetic particles suspended in fluid if so desired. Recording head 320 where the paper is tangent to the surface of permanently magnetized drum 308. The toner particles are permanently affixed to the surface of paper 310 by heater 304. The finished print then passes between rollers 302 after which it may be cut or folded as desired.

Figure 9:
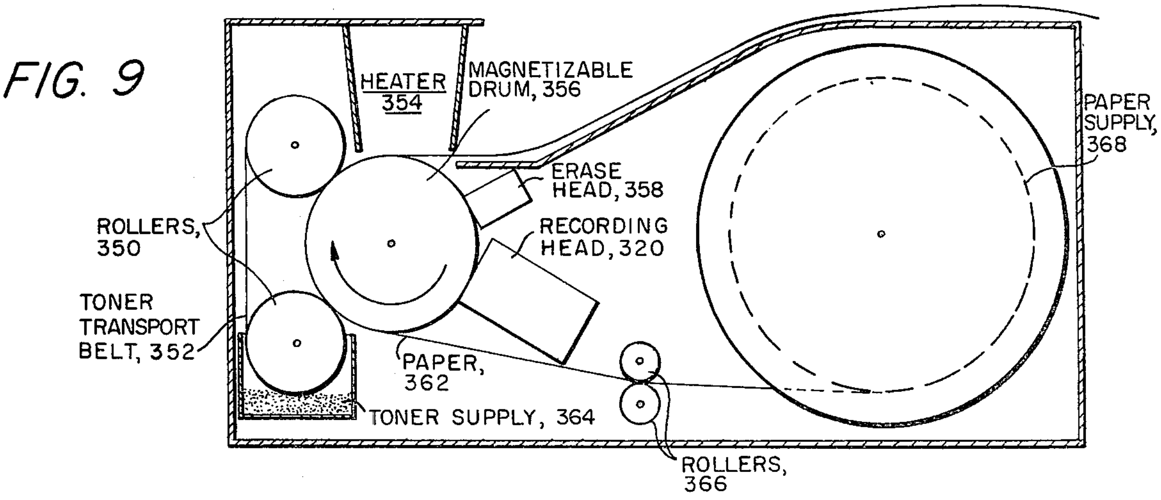
FIG. 9 is a cross-sectional view of magnetographic printing apparatus in accordance with still a further embodiment of the invention.

Recording head 320 may also be used to magnetize a recording medium, especially a magnetizable drum such as shown with the device of FIG. 9. Recording head 320 is activated as described earlier so as to produce the desired magnetization patterns upon magnetizable drum 356. The magnetized portions of magnetizable drum 356 are brought into contact with paper 362 supplied from paper supply roll 368 through rollers 366 and magnetic toner particles applied on the outer surface thereof by toner transport belt 352. Toner transport belt 352 has a single layer of magnetic particles on the outer surface thereof picked up from toner supply 364. After the magnetic toner particles have been deposited in the character patterns, the toner particles are permanently affixed to the outer surface of paper 362 by heater 354. Erase head 358 is provided for erasing the magnetized patterns from the surface of magnetizable drum 356.

With any of the embodiments of the invention herein described it may be desired to align the recording heads and either bubble plate or moving vanes to compensate for movement of the recording belt or printing surface so that the parallel lines of the printed characters will not appear tilted from an axis perpendicular to the direction of motion of the recording medium or printing surface by an angle such that the parallel lines of the magnetization patterns or printed characters will be perpendicular to the direction of motion.

Although preferred embodiments of the invention have been described, it is believed that numerous modifications and alterations thereto would be apparent to one having ordinary skill in the art without departing from the spirit and scope of the invention.

What is claimed is:

1. In combination:
   a recording medium;
   a medium for providing a plurality of moveable cylindrical magnetic domains localized within said medium adjacent a surface of said recording medium;
   means for propagating said magnetic domains parallel to said surface of said recording medium;
   means for producing at least first and second values of a magnetic field in response to an electrical current, said magnetic field from said magnetic field producing means interacting with the magnetic field of said magnetic domains to magnetize said recording medium in the region of said recording medium adjacent said magnetic domains for said first value and not magnetizing said recording medium for said second value;
   means for producing said current to activate said magnetic field producing means to magnetize said recording medium in predetermined character image patterns; and
   means for supplying magnetic toner particles to the magnetized recording medium.

2. The combination of claim 1 wherein said means for producing said first and second values of a magnetic field comprises:
   a plurality of electromagnet means, said electromagnet means being disposed substantially parallel to the propagation path of said magnetic domains.

3. The combination of claim 2 wherein said means for providing a plurality of magnetic domains comprises:
   a plate of ferromagnetic material.

4. The combination of claim 3 wherein said ferromagnetic material comprises:
   rare-earth orthoferrite material.

5. The combination of claim 4 wherein said rare-earth orthoferrite material comprises:
   $YbFeO_3$.

6. The combination of claim 2 wherein said propagating means comprises:
   at least one meander strip upon a surface of said plate.

7. The combination of claim 6 wherein:
   said recording medium has a coercive magnetization less than the total magnetic field at said recording medium when said magnetic field producing means produces said first value of said magnetic field and greater than the total magnetic field at said recording medium when said magnetic field producing means produces said second value of magnetic field.

8. The combination of claim 7 wherein said recording medium comprises:
   a belt having a layer of magnetizable material.

9. The combination of claim 7 wherein said recording medium comprises:
   a drum having a layer of magnetizable material.

10. The combination of claim 7 wherein:

said recording medium has a compensation temperature greater than the temperature of said medium during magnetization of said medium.

11. The combination of claim 10 further comprising:

means for substantially demagnetizing said recording medium.

12. The combination of claim 11 wherein said erasing means comprises:

means for heating said recording medium to a temperature higher than said compensation temperature.

13. In combination:

a continuous surface of magnetized material;

means for rotating said continuous surface;

means for supplying magnetic toner particles to said continuous surface;

means for supporting one or more moveable cylindrical magnetic domains localized within said supporting means;

means for propagating said magnetic domains along a line substantially parallel to said continuous surface;

means for passing s sheet of recording material between said magnetic domain supporting means and said continuous surface;

a plurality of electromagnet means positioned along said line parallel to said continuous surface, said sheet of recording material and said continuous surface passing between said electromagnet means and said magnetic domain supporting means, the magnetic field produced at said sheet of recording material adjacent said magnetic domains as the sum of the magnetic fields produced by said magnetic domains and by said electromagnet means being sufficient to overcome the coercive magnetization of said recording material for a first value of current passed through said electromagnet means and insufficient for a second value of said current; and means for producing said current for activating said electromagnet means to magnetize said continuous surface in predetermined character image patterns.

14. The combination of claim 13 wherein said predetermined patterns comprise:

alphabetic and/or numeric characters; and wherein:

each of said electromagnet means has a width corresponding to the width of said characters.

15. The combination of claim 13 wherein said continuous surface comprises:

a continuous belt.

16. The combination of claim 13 wherein said continuous surface comprises:

a drum.

17. The combination of claim 13 wherein:

said continuous surface is magnetized with the direction of magnetization being cyclically varied at a predetermined distance.

18. In combination:

a recording surface;

a plurality of electromagnet means, said electromagnet means being arranged along a line parallel to the surface of said recording surface upon a first side of said surface;

a plurality of substantially identical magnetically permeable vanes, each of said vanes comprising a strip of magnetically permeable material, said vanes being moveable along said lines, the center-to-center spacing of said vanes being the same as the center-to-center spacing of said electromagnet means, said vanes being positioned upon the side of said surface opposite said first surface;

means for activating said electromagnet means, said activating means comprising means for varying the current in said electromagnet means to magnetize said recording surface in predetermined character image patterns, each of said character patterns comprising a plurality of substantially parallel lines of magnetization; and means for supplying magnetic toner particles to the magnetized recording surface.

19. The combination of claim 18 further comprising:

means for moving said vanes along said line.

20. The combination of claim 19 wherein said moving means comprises:

a rotating belt.

21. The combination of claim 20 further comprising:

means for supplying toner particles to said recording surface, said toner particles adhering to magnetized patterns on said recording surface; and means for transferring said toner particles from said recording surface to a printing surface.

22. The combination of claim 21 wherein:

said recording surface has a magnetic compensation temperature more than the temperature of said recording medium when said patterns are magnetized thereon; and wherein said transferring means comprises:

means for heating said recording surface to a temperature greater than said compensation temperature.

* * * * *

UNITED STATES PATENT OFFICE
CERTIFICATE OF CORRECTION

Patent No. 4,135,195 Dated January 16, 1979

Inventor(s) Ernst F. R. A. Schloemann

It is certified that error appears in the above-identified patent and that said Letters Patent are hereby corrected as shown below:

Column 3, Line 65: Change "the" (first occurrence) to --then--.

Column 4, Line 66: Change "140" to --104--.

Signed and Sealed this

***Eleventh* Day of *May 1982***

[SEAL]

*Attest:*

GERALD J. MOSSINGHOFF

*Attesting Officer* *Commissioner of Patents and Trademarks*